(12) United States Patent
Ashwood-Smith

(10) Patent No.: US 10,284,933 B2
(45) Date of Patent: May 7, 2019

(54) NON-SYMMETRIC INTERCONNECTION OVER FIBER

(71) Applicant: Peter Ashwood-Smith, Gatineau (CA)

(72) Inventor: Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 15/056,335

(22) Filed: Feb. 29, 2016

(65) Prior Publication Data

US 2017/0251286 A1  Aug. 31, 2017

(51) Int. Cl.
*H04Q 11/00* (2006.01)

(52) U.S. Cl.
CPC . *H04Q 11/0062* (2013.01); *H04Q 2011/0086* (2013.01)

(58) Field of Classification Search
CPC ....... H04Q 11/0005; H04Q 2011/0039; H04Q 11/0062; H04Q 2011/0052; H04Q 2011/0015
See application file for complete search history.

(56) References Cited

U.S. PATENT DOCUMENTS

| 4,528,695 A | 7/1985 | Khoe |
| 6,005,694 A * | 12/1999 | Liu ............. H04B 10/071 398/20 |
| 2011/0033187 A1 | 2/2011 | Rossetti Damiano et al. |
| 2015/0043905 A1* | 2/2015 | Graves ........... H04Q 11/0005 398/25 |

FOREIGN PATENT DOCUMENTS

| CN | 101686083 A | 3/2010 |
| EP | 1221822 A2 | 7/2002 |
| WO | 2004068874 A2 | 8/2004 |

* cited by examiner

*Primary Examiner* — Ted M Wang

(57) ABSTRACT

In a configuration wherein N individual fibers interconnect two devices, each fiber can be configured, through configuration of the packet processing devices at each end of the fiber, to carry traffic in a single direction. From the perspective of the first device, an arbitrary subset T of the N fibers can be used for transmitting signals to the second device. The packet processing devices terminating a subset R of the remaining N-T fibers can be configured so that the first device may receive signals from the second device.

17 Claims, 4 Drawing Sheets

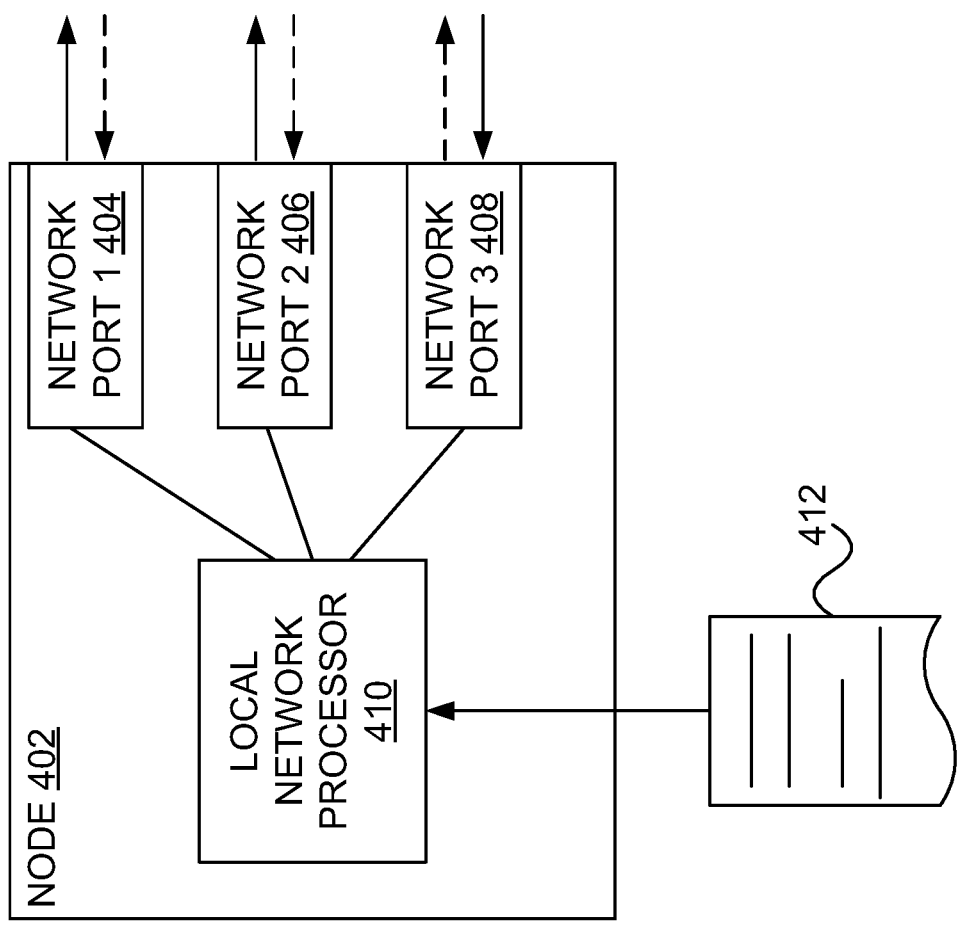

NON-SYMMETRIC INTERCONNECTION OVER FIBER

FIELD

The present application relates generally to optical networking and, more specifically, to a non-symmetric interconnection over fiber.

BACKGROUND

Link Aggregation ("LAG") allows multiple parallel network links between a first device and a second device to be treated as a single network link. The aggregated link will appear as a logical link that has a higher capacity than any of the individual network links. Each individual network link in the aggregated link may be referred to as a "LAG member." A bi-directional LAG, is often implemented as a pair of optical fibers: one fiber on which to transmit (TX); and the other fiber on which to receive (RX). Notably, it is generally understood that many routers and switches do not support bidirectional use of fibers. Conventionally, to save expense, routers and switches do not provide support for using the TX fiber for receiving or using the RX fiber for transmitting. The hardware used to allow for bidirectional flow on a fiber is considered to be expensive and, given that the capacity of the fiber is reduced, generally not worth the expense.

Given 2N fibers between two devices, the common choice for bandwidth between the two devices, when using typical routers and switches, is N in one direction and N in the other direction. When using typical routers and switches, asymmetric use of the bandwidth is not permitted.

SUMMARY

In a configuration wherein N individual fibers interconnect two nodes, each fiber can be configured, through configuration of the packet processing devices at each end of the fiber, to carry traffic in a single direction. From the perspective of the first node, an arbitrary subset T of the N fibers can be used for transmitting signals to the second device. The packet processing devices terminating at least some of the remaining N-T fibers can be configured so that the first node may receive signals from the second node.

According to an aspect of the present disclosure, there is provided a method of operating a control system for an interconnection between a first device and a second device, the interconnection formed using a plurality of fibers. The method includes selecting a first fiber among the plurality of fibers, the first fiber for carrying transmission from the first device to the second device, and transmitting, to the first device, instructions directing configuration of a packet processing device connected, at the first device, to the first fiber, to select a mode that connects a first device transmit module to the first fiber. In another aspect, a control system is provided for carrying out this method.

According to another aspect of the present disclosure, there is provided a device. The device includes a transmitter module, a receiver module, a packet processing device connected to a fiber and configured to, in a first mode, connect the fiber to the transmitter module and in a second mode, connect the fiber to the receiver module and a control system configured to control the packet processing device to select between the first mode and the second mode.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which:

FIG. 4 illustrates a control plane for a node in accordance with aspects of the present application.

DETAILED DESCRIPTION

It is known that typically there are no physical impediments, associated with a fiber, to transmitting and receiving simultaneously on the fiber. It is also known that there are often asymmetric bandwidth demands in the two directions. There are, however, many challenges. One challenge, among the many challenges, relates to properly filtering signals to avoid reflections that lead to transmissions in opposite directions interfering with one another. Such filtering adds to the cost of implementation. Furthermore, in conventional implementations of variable transmission and reception (for example, 10% of wavelengths configured for traffic in one direction and 90% of wavelengths configured for traffic in the other direction, variable filters are required. Below are disclosed methods and corresponding apparatus for allowing an allocation, and re-allocation if desired, of individual links within a plurality to a particular direction of data traffic.

Figure 1:
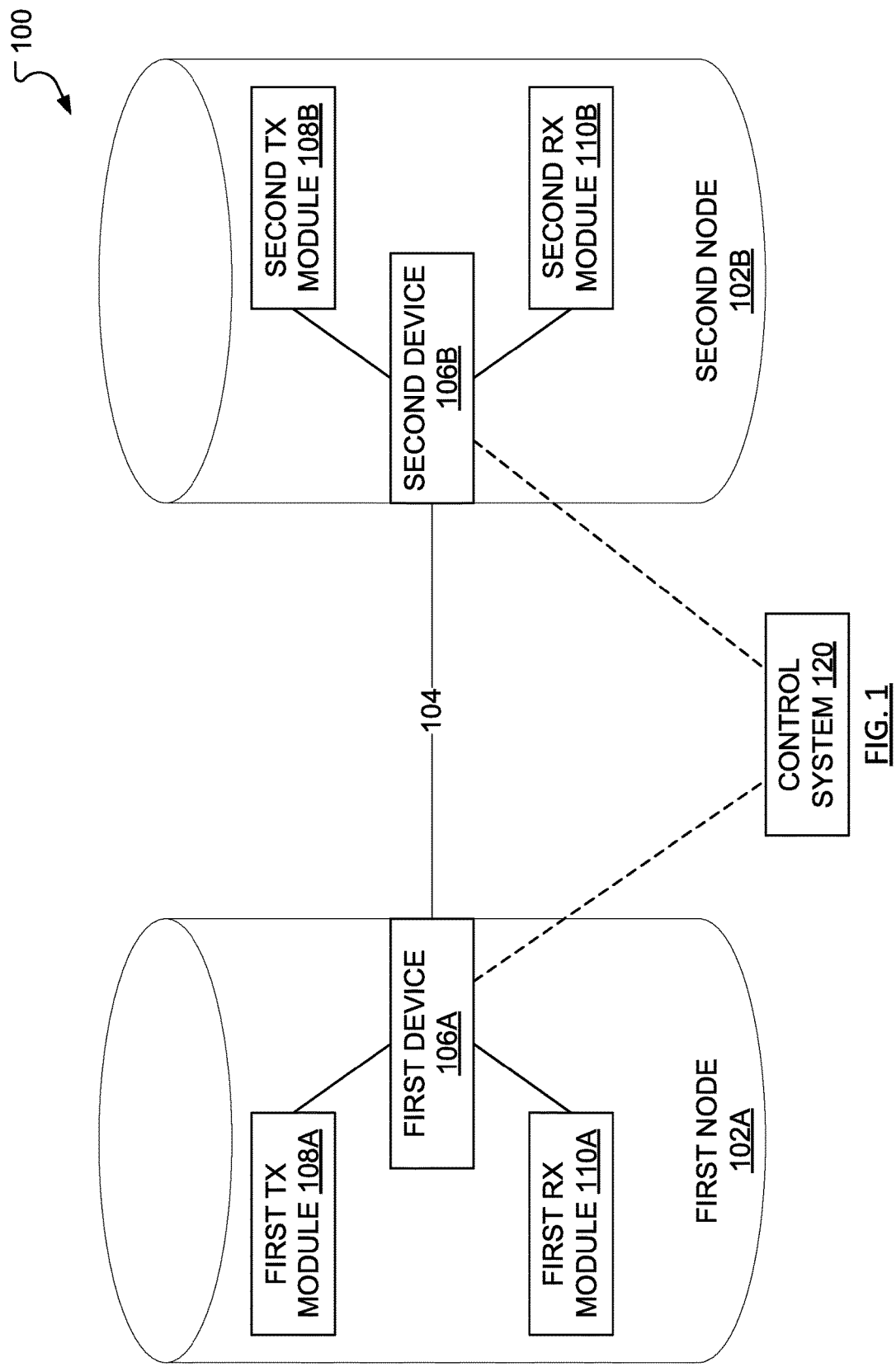
FIG. 1 illustrates a single-fiber optical interconnection between two nodes, in accordance with aspects of the present application.

FIG. 1 illustrates an optical network 100 including a first node 102A connected to a second node 102B by a fiber 104. The first node 102A includes a first packet processing device 106A, a first TX module 108A and a first RX module 110A. The second node 102B includes a second packet processing device 106B, a second TX module 108B and a second RX module 110B. The two packet processing device 106A, 106B may be described as 2:1 bi-directional packet processing devices. The "1" side of the first packet processing device 106A connects to the fiber 104. One branch of the first packet processing device 106A connects to the first TX module 108A, while the other branch of the first packet processing device 106A connects to the first RX module 110A. Similarly, one branch of the second packet processing device 106B connects to the second TX module 108B, while the other branch of the second packet processing device 106B connects to the second RX module 110B.

The term "packet processing device," used here for the element associated with the reference numerals 106A and 106B is a generic term for a controllable element that may be configured, at various times, to originate, terminate and transit packet-based communication.

In operation, there is a first mode wherein the first packet processing device 106A connects the fiber 104 to the first TX module 108A. There is also a second mode wherein the first packet processing device 106A connects the fiber 104 to the first RX module 110A. This enables the first node 102A to use the fiber 104 as either a transmitting fiber or a receiving fiber.

The optical network 100 of FIG. 1 includes a control system 120 configured to control the packet processing devices 106A, 106B to select a transmission direction for the fiber 104. For example, to select a transmission direction defined as first node 102A to second node 102B for the fiber 104, the control system 120 controls the first packet processing device 106A to select the first mode, wherein the first packet processing device 106A connects the fiber 104 to the first TX module 108A. The control system 120 also controls the second packet processing device 106B to select the second mode, wherein the second packet processing device 106B connects the fiber 104 to the second RX module 110B.

Figure 2:
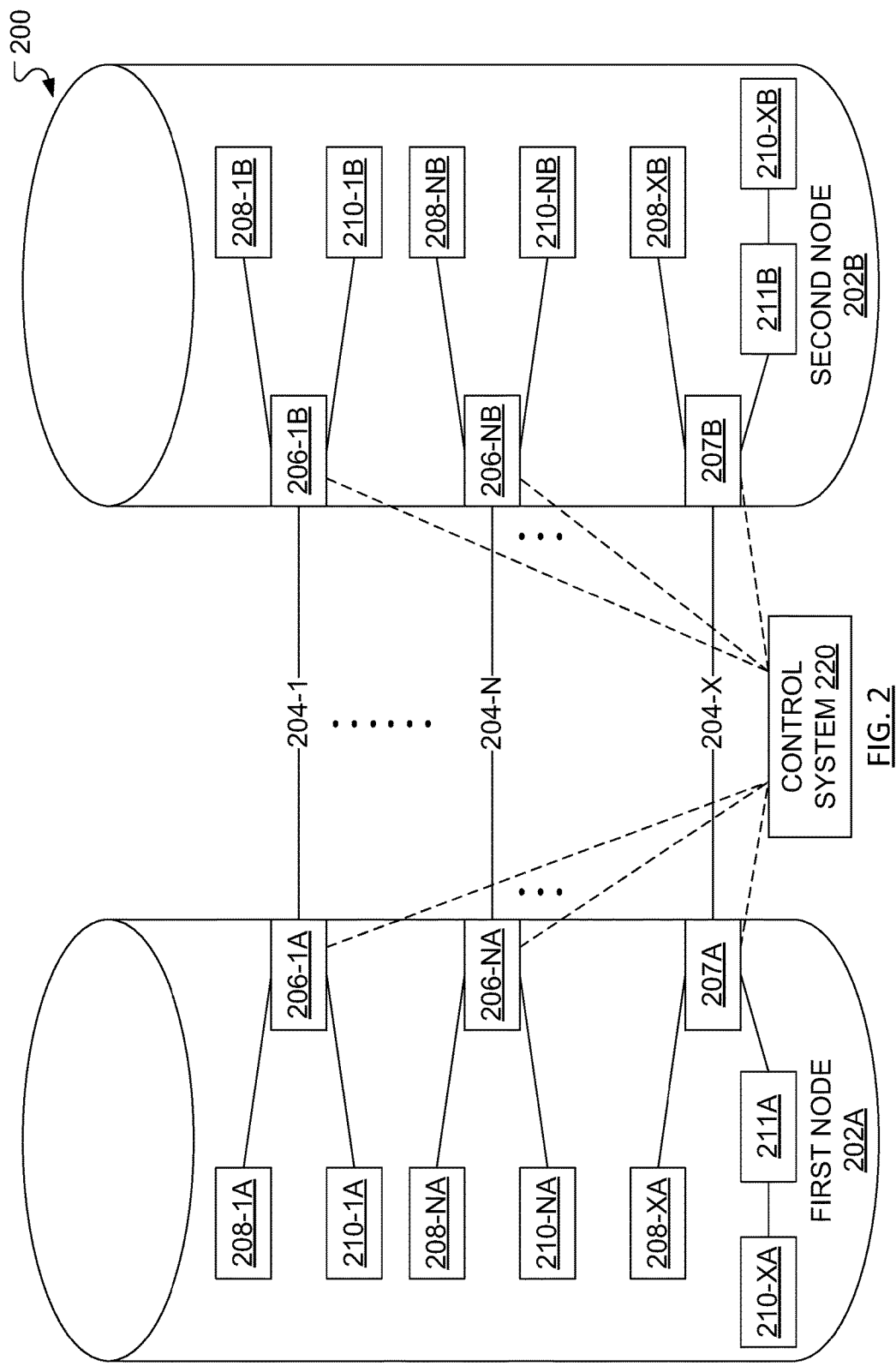
FIG. 2 illustrates a multiple-fiber optical interconnection between two nodes, the interconnection under control of a control system, in accordance with aspects of the present application.

FIG. 2 illustrates an optical network 200 including a first node 202A connected to a second node 202B by N+1 fibers 204-1, . . . , 204-N, 204-X (individually or collectively 204). The first node 202A includes, for each fiber 204, a first packet processing device 206-1A, . . . , 206-NA (individually or collectively 206A), a first TX module 208-1A, . . . , 208-NA, 208-XA (individually or collectively 208A) and a first RX module 210-1A, . . . , 210-NA, 210-XA (individually or collectively 210A). The second node 202B includes, for each fiber 204, a second packet processing device 206-1B, . . . , 206-NB (individually or collectively 206B), a second TX module 208-1B, . . . , 208-NB, 208-XB (individually or collectively 208B) and a second RX module 210-1B, . . . , 210-NB, 210-XB (individually or collectively 210B). The "1" side of each of the first packet processing devices 206A connects to the fibers 204. One branch of the first packet processing devices 206A connects to the respective first TX modules 208A, while the other branch of the first packet processing devices 206A connects to the respective first RX modules 210A. Similarly, one branch of the second packet processing devices 206B connects to the respective second TX modules 208B, while the other branch of the second packet processing devices 206B connects to the respective second RX modules 110B.

The optical network 200 of FIG. 2 includes a control system 220 configured to control each of the packet processing devices 206A, 206B to select a transmission direction for a respective fiber 204. For example, to select a transmission direction defined as first node 202A to second node 202B for the first fiber 204-1, the control system 220 controls the first packet processing device 206-1A to select the first mode, wherein the first packet processing device 206-1A connects the fiber 204-1 to the first TX module 208-1A. The control system 220 also controls the second packet processing device 206-1B to select the second mode, wherein the second packet processing device 206-1B connects the fiber 204-1 to the second RX module 210-1B.

In the network 200, the control system 220 may configure a subset, T, of the N fibers 204A, . . . , 204N for transmissions from the first node 202A to the second node 202B. Additionally, the control system 220 may configure a subset N-T of the fibers 204A, . . . , 204N for transmission from the second node 202B to the first node 202A.

The N+1 fiber 204-X is an optional, additional fiber. At the first device end of the additional fiber 204-X, in place of a packet processing device 206, may be a first splitter/combiner 207A. At the second node end of the additional fiber 204-X, in place of a packet processing device 206, may be a second splitter/combiner 207B. Furthermore, although there may be a direct path from the first splitter/combiner 207A in the first node 202A to the first TX module 208-XA, the path from the first splitter/combiner 207A to the first RX module 210-XA may include a first filter 211A. Similarly, although there may be a direct path from the second splitter/combiner 207B in the second node 202B to the second TX module 208-XB, the path from the second splitter/combiner 207B to the second RX module 210-XB may include a second filter 211B.

As will be discussed hereinafter, the use of the first filter 211A and the second filter 211B may be understood to facilitate simultaneous bi-directional traffic on the additional fiber 204 by reducing, to the extent practical, receipt, at the receiver 210-XA, 210-XB, of signals transmitted at the corresponding transmitter 208-XA, 208-XB.

In overview, in a configuration wherein N individual fibers 204 interconnect the first node 202A and the second node 202B, each fiber 204 can be configured, through configuration of the packet processing devices 206 at each end of the fiber 204, to carry traffic in a single direction. From the perspective of the first node 202A, an arbitrary subset (possibly an empty subset, possibly the complete set) T of the N fibers can be used for transmitting signals to the second node 202B. R (where $R \leq N-T$) fibers 204 (also, possibly an empty subset, possibly the complete set) can be used for receiving signals from the second node 202B. It should be understood that in many embodiments, $N=R+T$. However, it should be understood that it is possible that if not all the fibers are required for transmission, some of them can be left unused (so-called dark fibers). It should also be noted that when reference is made to Transmitting fibers and Receiving fibers, this notation is based on the state of the fiber from the perspective of the node designated as the first node. When a first node is in communication with a second node, reference to T fibers transmitting should be understood to refer to T fibers being used to unidirectionally transmit from the first node to the second node. Similarly, with R receiving fibers, this refers to R fibers being used to unidirectionally receive at the first node from the second node. From the perspective of the second node, the values for T and R would be switched.

Any one of the fibers 204 can be moved from the subset of T transmission fibers to the subset of R reception fibers by reconfiguration. Sets of such fibers being used in the same direction can be used to create LAG or FlexEthernet bundles for the higher layers.

Consider an example scenario wherein N=5 and the additional fiber 204-X is unavailable. Based on instructions from the control system 220, an original configuration may be established with T=3 transmission fibers 204 and R=2 reception fibers 204. More particularly, the control system 220 may establish the original configuration by instructing T=3 of the first packet processing devices 206A (e.g., the first three packet processing devices) to connect respective fibers 204 to respective TX modules 208A. Because these fibers 204 are now used to transmit data from the first node to the second node, the control system 220 will also transmit instructions for the corresponding packet processing devices 206B (e.g. the first three switches) to connect the fiber to the receivers. The controller additionally instructs that R=2 switches in the first node be configured to connect the fiber to receivers, and that the corresponding switches in the second node connect the fiber to transmitters.

Subsequently, the control system 220 may move the fiber 204-1 from the subset of T transmission fibers to the subset of R reception fibers. More particularly, the control system 220 may accomplish such reconfiguration by instructing the first packet processing device 206-1A and the second packet processing device 206-1B such that the first RX module 208-1A connects to the second TX module 210-1B.

In the preceding example, a ratio of TX bandwidth to RX bandwidth of 3 to 2 is reconfigured to 2 to 3. Such reconfiguration may occur responsive to statistics gathered on demands for traffic from the first node 202A to the second node 202B and traffic from the second node 202B to the first node 202A.

Consider a second example scenario wherein N=4 and the additional fiber 204-X is available. Based on instructions from the control system 220, an original configuration is established with T=3 transmission fibers 204 and R=2 reception fibers 204. More particularly, the control system 220 establishes the original configuration, in part, by instructing two of the first node packet processing devices 206A (including the first packet processing devices 206-1A) such that the two of the first TX modules 208A connect to their respective fibers 204. The control system 220 establishes the original configuration, in another part, by instructing the two corresponding second node packet processing devices 206B (including the second packet processing device 206-1B) such that the two corresponding second node packet processing devices 206B connect to their respective fibers 204. The result is that two of the first TX modules 208A connect to two of the second RX modules 210B. The control system 220 may further instruct the first splitter/combiner 207A and the second splitter/combiner 207B such that 100% of the wavelengths from the first TX module 208-XA connect, via the second filter 211B, to the second RX module 210-XB. The control system 220 further instructs the remaining R=2 of the first packet processing devices 206A and the R=2 corresponding second packet processing devices 206B such that R=2 of the second TX modules 208B connect to R=2 of the first RX modules 210A. In this way, a TX bandwidth to RX bandwidth ratio of 3 to 2 is established.

Subsequently, the control system 220 can reconfigure the first and second nodes to establish a TX bandwidth to RX bandwidth ratio of 3.2 to 2.8. The control system 220 may instruct the first splitter/combiner 207A and the second splitter/combiner 207B such that 20% of the wavelengths from the first TX module 208-XA connect, via the second filter 211B, to the second RX module 210-XB. Correspondingly, the control system 220 may instruct the first splitter/combiner 207A and the second splitter/combiner 207B such that 80% of the wavelengths from the second TX module 208-XB connect, via the first filter 211A, to the first RX module 210-XA. Notably, signals from the second TX module 208-XB may, in part, be reflected by the first splitter/combiner 207A. Usefully, however, very little, if any, of the reflected signals that arrive at the second splitter/combiner 207B are allowed to pass through the second filter 211B to arrive at the second RX module 210-XB. Similarly, signals from the first TX module 208-XA may, in part, be reflected by the second splitter/combiner 207B. Usefully, however, very little, if any, of the reflected signals that arrive at the first splitter/combiner 207A are allowed to pass through the first filter 211A to arrive at the first RX module 210-XA.

Conveniently, through implementation of aspects of the present application, asymmetric bandwidth between large nodes can be controlled to a granularity of about one fiber capacity, without having to use simultaneous transmission and reception on the same fiber. Sub-single-fiber granularity can be obtained when the additional fiber 204-X is employed.

Aspects of the present application allow for asymmetric bandwidth usage between similarly configured nodes with arbitrary numbers of connecting fibers. A certain granularity of asymmetric bandwidth can be achieved without establishing bi-directional traffic on one or more fiber. Further granularity can be achieve through the supplemental establishment of bi-directional traffic on one or more fibers.

It is current practice to employ multiple pairs of fibers when large amounts of bandwidth are required between two networking nodes. In these known configurations and from the perspective of one of the nodes, one of the fibers in each pair is used for transmission and one of the fibers is used for reception, regardless of the asymmetric nature of the communication between the nodes. This may be considered to waste bandwidth.

Aspects of the present application propose to allow N fibers (not necessarily even) to be configured such that T of the N fibers are transmit only and up to N-T of the N fibers are receive only. A configurable packet processing device at each end of each fiber allows the selection of a mode, i.e., TX only or RX only, for the fiber. The decision as to the value of T in the range 0 . . . N is a higher level networking decision, but any value is possible. The value of T could change relatively quickly, to meet changes in the asymmetry of demand.

It is possible, as illustrated in FIG. 2, to augment the N fibers configured for unidirectional traffic with one or a small number of fibers configured for bidirectional traffic, i.e., the additional fiber 204-X of FIG. 2, where the bidirectional traffic is processed in such a manner that the entire set of fibers can offer granularity of asymmetry to the level of a single wavelength.

Assuming each fiber 204 in FIG. 2 supports the same capacity and can support 100 wavelengths (each wavelength supporting the same capacity), then, with five unidirectional fibers (N=5), T may range from 0 to 5 and R may, correspondingly, range from 5 to 0. Available ratios of representative of T:N-T include 0:5, 1:4, 2:3, 3:2, 4:1 and 5:0. These ratios may be expressed as percentages as follows: 0%; 20%; 40%; 60%; 80%; and 100%. If one fiber among the five fibers is arranged to terminate on both ends with splitter/combiners, consistent with the additional fiber 204-X of FIG. 2, so as to allow bi-directional traffic on the fiber, the available ratios expressed as percentages include every integer percentage in the range 0-100%, inclusive, assuming that the splitter/combiners can operate down to the granularity of a tenth of the number of wavelengths available.

Figure 3:
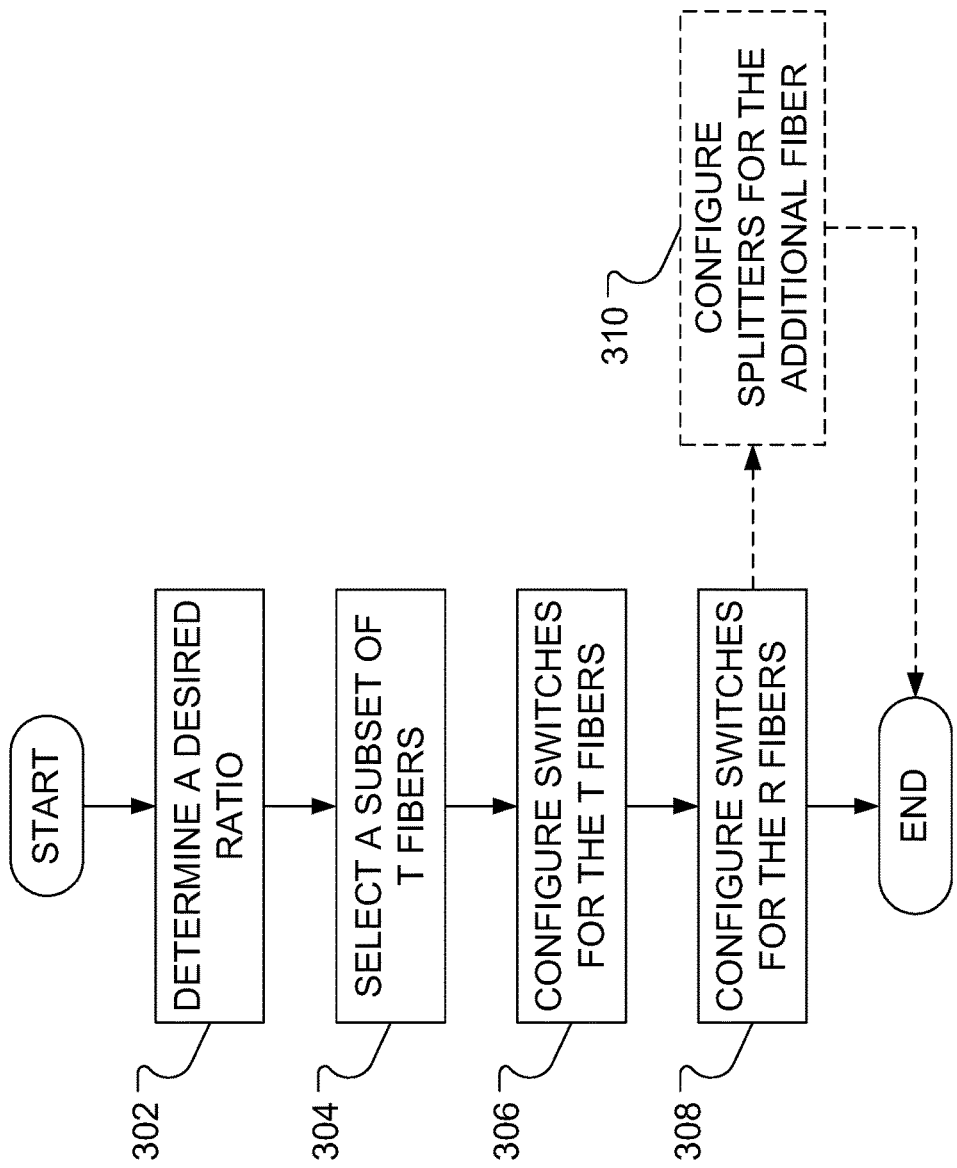
FIG. 3 illustrates example steps in a method of operation of the control system of FIG. 2, in accordance with aspects of the present application.

FIG. 3 illustrates example steps in a method of operating the control system 220 of FIG. 2. Initially, the control system 220 may determine (step 302) a desired ratio of transmission bandwidth to reception bandwidth. The determination may be made on the basis of receiving, from a central instruction device (not shown), an indication of anticipated bandwidth requirements for traffic in each direction. Based on the desired ratio, the control system 220 may select (step 304) a particular subset of T fibers for traffic from the first node 202A to the second node 202B. The selecting (step 304) may, for example, occur while factoring in the capacity supported by each fiber 204. The control system 220 may then send (step 306), to the first node 202A and to the second node 202B, mode instructions so that the packet processing devices 206A, 206B terminating the subset of T fibers are appropriately configured for traffic flow from the first node 202A to the second node 202B. That is, based on instructions received from the control system 220, certain of the first node packet processing devices 206A select a first mode, thereby connecting respective first TX modules 208A to respective fibers 204 in the subset of T fibers. Similarly, based on instructions received from the control system 220, certain of the second node packet processing devices 206B select a second mode, thereby connecting respective second RX modules 210B to respective fibers 204 in the subset of T fibers. The control system 220 may then send (step 308), to the first node 202A and to the second node 202B, mode instructions so that the packet processing devices 206A, 206B terminating a further subset of R fibers may be appropriately configured for traffic flow from the second node 202B to the first node 202A. That is, based on instructions received from the control system 220, certain of the first node packet processing devices 206A select a second mode, thereby connecting respective first RX modules 210A to the respective fibers 204 in the subset of R fibers. Similarly, based on instructions received from the control system 220, certain of the second node packet processing devices 206B select a first mode, thereby connecting respective second TX modules 208B to respective fibers 204 in the subset of R fibers.

Optionally, the control system may send (step 310), to the first node 202A and to the second node 202B, mode instructions so that the first splitter 207A connects a plurality of wavelengths from the first TX module 208-XA to the additional fiber 204-X and so that the second splitter 207B connects the same plurality of wavelengths from the additional fiber 204-X to the second RX module 210-XB via the second filter 211B. The control system may also send (step 310), to the first node 202A and to the second node 202B, mode instructions so that the second splitter 207B connects a distinct plurality of wavelengths from the second TX module 208-XB to the additional fiber 204-X and so that the first splitter 207A connects the same distinct plurality of wavelengths from the additional fiber 204-X to the first RX module 210-XA via the first filter 211A.

One skilled in the art will appreciate that a node, such as one of the nodes 202A and 202B may be configured differently than illustrated in FIG. 2, while still providing the same functionality. FIG. 4 illustrates the control plane of one such embodiment node. An illustrated node 402 is a communication node which has three network ports, Network Port 1 404, Network Port 2 406 and Network Port 3 408, with which it communicates with an adjacent node. It should be noted that the number of network ports can be varied in different implementations. The network ports 404, 406 and 408 can each function as ingress or egress ports. By their nature, optical fibers connecting the node 402 to another node are generally agnostic as to the direction of the traffic carried. Thus, by allowing each of the network ports 404, 406 and 408 to change from an egress mode to an ingress mode and vice versa, an asymmetrical bandwidth allocation can be achieved.

The mode in which network ports 404, 406 and 408 operate is controlled by a local network processor 410. The local network processor 410 receives a control message 412. The control message 412 may be transmitted by a network controller (not shown), such as a Software Defined Networking Controller. In accordance with the received control message 412, the local network processor 410 instructs each of the network ports 404, 406 and 408 to operate in one of an ingress or an egress mode.

Controlled coordination of the control message 412 allows for nodes in either side of a set of fiber links to be configured in a coordinated manner. This allows for a dynamic allocation of the bandwidth available between two nodes. When the individual links are joined together in a LAG, it allows for a reallocation of the directional bandwidth in a LAG group.

A network port may have both a transmit and receive port connected to the fiber by a packet processing device, as illustrated earlier, or it may have any number of other implementations including the use of controllable filters, splitters, taps and other techniques that will be understood by those skilled in the art.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of operating a control system for an interconnection between a first device and a second device, the interconnection formed using a plurality of fibers, the method comprising:
   determining a desired ratio of transmission bandwidth to reception bandwidth;
   selecting, in consideration of bandwidth capacities associated with available fibers of the plurality of fibers, one or more fibers of the plurality of fibers for carrying transmission between the first device and the second device; and
   transmitting, to the first device, instructions directing configuration of a packet processing device connected, at the first device, to the one or more fibers, to select between enabling a connection between the one or more fibers and a first device transmit module and enabling a connection between the one or more fibers and a first device receive module.

2. The method of claim 1 further comprising:
   transmitting, to the second device, instructions directing configuration of a packet processing device connected, at the second device, to the one or more fibers, to select between enabling a connection between the one or more fibers and a second device transmit module and enabling a connection between the one or more fibers and a second device receive module;
   wherein, when the instructions transmitted to the first device directs the packet processing device at the first device to enable the connection between the one or more fibers and the first device transmit module, the instructions transmitted to the second device directs the pack processing device at the second device to enable the connection between the one or more fibers and the second device receive module, to enable transmission from the first device to the second device over the one or more fibers.

3. The method of claim 2, wherein, when the instructions transmitted to the first device directs the packet processing device at the first device to enable the connection between the one or more fibers and the first device receive module, the instructions transmitted to the second device directs the pack processing device at the second device to enable the connection between the one or more fibers and the second device transmit module, to enable transmission from the second device to the first device over the one or more fibers.

4. The method of claim 1 wherein the plurality of fibers further includes a third fiber, wherein a first signal carried on the third fiber is terminated, at the first device, at a first splitter, wherein the method further comprises:
   transmitting, to the first device, instructions directing configuration of the first splitter to connect a plurality of wavelengths from the third fiber to a first device receive module via a first device filter.

5. The method of claim 4, wherein the third fiber is a bidirectional fiber.

6. The method of claim 1 further comprising:
transmitting, to the first device, instructions directing configuration of packet processing devices connected to at least one of the fibers to obtain a coarse ratio of transmission bandwidth to reception bandwidth.

7. The method of claim 6 further comprising:
transmitting, to the first device, instructions directing configuration of a splitter connected to at least another one of the fibers to obtain a fine ratio of transmission bandwidth to reception bandwidth.

8. The method of claim 1 further comprising aggregating given fibers among the plurality of fibers to form an asymmetric Link Aggregation member.

9. The method of claim 1 further comprising aggregating given fibers among the plurality of fibers to form an asymmetric FlexEthernet bundled channel.

10. The method of claim 1, wherein the one or more fibers comprise a unidirectional fiber.

11. A control system for an interconnection between a first device and a second device, the interconnection formed using a plurality of fibers, the control system configured to:
determine a desired ratio of transmission bandwidth to reception bandwidth;
select, in consideration of bandwidth capacities associated with available fibers of the plurality of fibers, one or more fibers of the plurality of fibers for carrying transmission between the first device and the second device;
transmit, to the first device, instructions directing configuration of a packet processing device connected, at the first device, to the one or more fibers, to select between enabling a connection between the one or more fibers and a first device transmit module and enabling a connection between the one or more fibers and a first device receive module.

12. The control system of claim 11 wherein the control system is further configured to transmit, to the second device, instructions directing configuration of a packet processing device connected, at the second device, to the one or more fibers, to between enabling a connection between the one or more fibers and a second device transmit module and enabling a connection between the one or more fibers and a second device receive module;
wherein, when the instructions transmitted to the first device directs the packet processing device at the first device to enable the connection between the one or more fibers and the first device transmit module, the instructions transmitted to the second device directs the pack processing device at the second device to enable the connection between the one or more fibers and the second device receive module, to enable transmission from the first device to the second device over the one or more fibers.

13. The control system of claim 11 wherein the plurality of fibers further includes a third fiber, wherein a first signal carried on the third fiber is terminated, at the first device, at a first splitter, wherein the control system is further configured to:
transmit, to the first device, instructions directing configuration of the first splitter to connect a plurality of wavelengths from the third fiber to a first device receive module via a first device filter.

14. The control system of claim 11 wherein the control system is further configured to:
transmit, to the first device, instructions directing configuration of packet processing devices connected to at least one of the fibers to obtain a coarse ratio of transmission bandwidth to reception bandwidth.

15. The control system of claim 11 wherein the control system is further configured to aggregate given fibers among the plurality of fibers to form an asymmetric Link Aggregation member.

16. The control system of claim 11 wherein the control system is further configured to aggregate given fibers among the plurality of fibers to form an asymmetric FlexEthernet bundled channel.

17. The control system of claim 14 wherein the control system is further configured to:
transmit, to the first device, instructions directing configuration of a splitter connected to at least another one of the fibers to obtain a fine ratio of transmission bandwidth to reception bandwidth.

* * * * *